G. W. Rains,
Steam Balanced Valve.

N° 27,384.      Patented Mar. 6, 1860.

Witnesses:
Henry T Brown
W<sup>m</sup> Tusch

Inventor:
Geo W Rains

UNITED STATES PATENT OFFICE.

GEO. W. RAINS, OF NEWBURGH, NEW YORK.

SLIDE-VALVE FOR STEAM-ENGINES.

Specification of Letters Patent No. 27,384, dated March 6, 1860.

*To all whom it may concern:*

Be it known that I, GEORGE W. RAINS, of Newburgh, in the county of Orange and State of New York, have invented a new and Improved Mode of Applying the Slide-Valves of Steam-Engines; and I do hereby declare that the following is a full, clear, and exact description of the same, reference being had to the accompanying drawing, forming part of this specification, in which—

Figure 1:
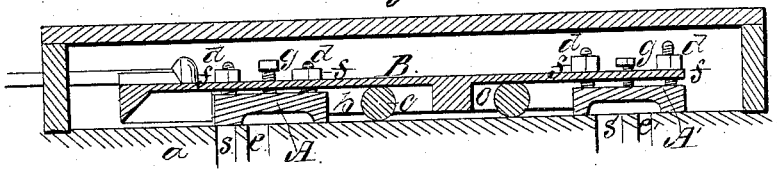
Figure 2:
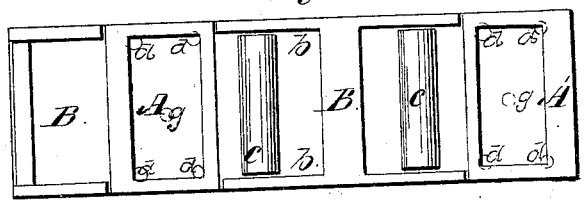

Figure 1, is a longitudinal section of a steam chest valve seat and slide valve illustrating my invention. Fig. 2, is a face view of the valve.

Similar letters of reference indicate corresponding parts in both figures.

To enable others skilled in the art to make and use my invention I will proceed to describe its construction and operation.

The drawing represents two short slide valves, one for each steam port of the cylinder.

S, is the steam chest and A, A', are the valves, of the usual construction.

*a*, is the seat.

*s*, *s'*, are the steam ports, and *e*, *e'*, the exhaust ports.

B, is the carriage consisting of a plate of about the same width as the valves, with an overhanging rim *b*, on each side, and *c*, *c*, are two rollers applied between the said carriage and the valve seat and between the valves, the said rollers being cylindrical and without journals or spherical and of such diameter as to keep the rims of the carriage at some distance from the seat, and the interior of the carriage being faced perfectly flat.

The valves are each suspended from the carriage by four screws *d*, *d*, and nuts *f*, *f*, the screws being secured in the valves perpendicularly to their faces and passing through holes in the carriage, and the nuts being screwed on at the back of the carriage; and a set screw *g*, is screwed through the carriage opposite to the center of each valve to keep it at the requisite distance from the carriage.

The valves and seat having been planed up or otherwise faced, the valves are fitted to the seat by first adjusting them to the carriage by means of the nuts *d*, *d*, and screws *g*, *g*, in such a manner that when they (the valves) bear on the seat the inner face of the carriage will be perfectly parallel with the seat, and the rollers will just fit loosely between the carriage and seat without constituting bearings for the carriage. Emery or other material of similar nature and water or oil are then applied to the seat, and the carriage with the rollers under it is worked back and forth till the faces of the valves and seat are so far ground as just to give the carriage a bearing upon the rollers which when the grinding material is washed away will roll between the carriage and seat and so enable the valves to work steam-tight but with no perceptible friction. The valves working in this way will be subject to very little wear and remain steam-tight for a long time, but if they (the valves) wear leaky the nuts *d*, *d*, may be a little slackened and the screws *g*, *g*, screwed up and the valves reground to the seat with emery as before.

The rollers instead of being applied between the two valves may be applied outside of the valves, in which case both ends of the carriage will require to extend beyond the valves as shown at the left hand of the figures of the drawing. If a single valve is used for both steam ports, the rollers will require to be applied in this way, one at each end of the carriage outside of the valve. If a sliding cut off is used at the back of the valve or valves it will require to be applied inside of the carriage, and rollers may be placed between the carriage and seat in either of the modes above described.

I do not claim broadly the use of rollers to relieve the slide valves of steam engines of pressure, but—

What I claim as my invention and desire to secure by Letters Patent, is,

The combination of the suspended valves A, A', with the carriage B, and rollers (*c*) as and for the purpose herein shown and described.

GEORGE W. RAINS.

Witnesses:
HENRY T. BROWN,
WM. TUSCH.